United States Patent
Box

(10) Patent No.: US 8,943,996 B2
(45) Date of Patent: Feb. 3, 2015

(54) BACKLIT GRADUATED GAUGE INCLUDING MEANS FOR SUPER-ILLUMINATING A PORTION OF THE GRADUATIONS

(75) Inventor: Benoît Box, Parmain (FR)

(73) Assignee: Johnson Controls Technology Company, Holland, MI (US)

( * ) Notice: Subject to any disclaimer, the term of this patent is extended or adjusted under 35 U.S.C. 154(b) by 765 days.

(21) Appl. No.: 13/058,845

(22) PCT Filed: Aug. 5, 2009

(86) PCT No.: PCT/EP2009/005666
§ 371 (c)(1),
(2), (4) Date: Feb. 11, 2011

(87) PCT Pub. No.: WO2010/017910
PCT Pub. Date: Feb. 18, 2010

(65) Prior Publication Data
US 2011/0139061 A1    Jun. 16, 2011

(30) Foreign Application Priority Data
Aug. 14, 2008 (DE) .......................... 10 2008 037 771
Mar. 20, 2009 (FR) ..................................... 09 01302

(51) Int. Cl.
*G01D 11/28* (2006.01)
*B60K 37/02* (2006.01)

(52) U.S. Cl.
CPC ............ *G01D 11/28* (2013.01); *B60K 37/02* (2013.01); *B60K 2350/203* (2013.01)
USPC .......................... 116/288; 166/286; 362/23.16

(58) Field of Classification Search
CPC ... G01D 11/28; B60K 2350/203; B60K 37/02
USPC ........ 116/286–288, 293, 295, 298, 300, 301, 116/DIG. 36, 62.1; 362/23, 26, 27, 29, 30, 362/23.01, 23.16, 23.17, 23.19, 23.2, 23.21
See application file for complete search history.

(56) References Cited

U.S. PATENT DOCUMENTS 3,930,459 A * 1/1976 Barrow .............................. 116/2
4,380,043 A * 4/1983 Takamatsu et al. ............. 362/26
(Continued)

FOREIGN PATENT DOCUMENTS

EP          1 800 890 A1    1/2008
WO    WO 2007/042322 A1    4/2007

OTHER PUBLICATIONS

Derwent Abstract of DE 10 2006046 405 A1, Bohse et al., "Display device e.g. for vehicle with two different articulation levels, has front pointer and rear pionter and arranged on instrument dial so that rear pointer of face covers some sections", published Jan. 24, 2008.*

(Continued)

*Primary Examiner* — R. A. Smith
*Assistant Examiner* — Tania Courson
(74) *Attorney, Agent, or Firm* — Foley & Lardner LLP

(57) ABSTRACT

The invention relates to a backlit motor vehicle gauge such as a speedometer or a revolution counter, which gauge has a wall provided with translucent graduations disposed over a circular arc, one or more light-emitting elements (16) carried by a support plate (13), and a light guide (18) interposed between the support plate (13) and the graduated wall so as to diffuse the light emitted by the light-emitting elements (16) towards a back face of the graduated wall in order to illuminate all of the graduations. According to the invention, the light guide (18) is mounted to pivot IO about an axis (AX) passing through the center of the circular arc while having its position servo-controlled, and said light guide (18) carries a spot lighting member (28) situated radially at the same level as the circular arc so as to highlight a portion of the region carrying the graduations. The invention is applicable to gauges designed to equip motor vehicles.

8 Claims, 2 Drawing Sheets

(56) References Cited

U.S. PATENT DOCUMENTS

| | | | |
|---|---|---|---|
| 6,178,917 B1 * | 1/2001 | Jansa | 116/286 |
| 6,302,551 B1 * | 10/2001 | Matumoto | 362/27 |
| 6,561,123 B2 * | 5/2003 | Kallinke et al. | 116/288 |
| 6,714,126 B2 * | 3/2004 | Wada | 340/438 |
| 6,827,034 B1 * | 12/2004 | Paulo | 116/286 |
| 6,854,416 B2 * | 2/2005 | Breinich et al. | 116/202 |
| 7,126,564 B2 * | 10/2006 | Schach et al. | 345/75.1 |
| 7,178,479 B1 * | 2/2007 | Richter | 116/288 |
| 7,305,932 B2 * | 12/2007 | Hildebrand et al. | 116/301 |
| 7,347,160 B2 * | 3/2008 | Honma et al. | 116/288 |
| 7,506,607 B2 * | 3/2009 | Takato | 116/301 |
| 7,675,428 B2 * | 3/2010 | Pala et al. | 340/815.78 |
| 7,771,069 B2 * | 8/2010 | Werman et al. | 362/29 |
| 7,810,445 B2 * | 10/2010 | Krishnamurthy | 116/288 |
| 7,905,612 B2 * | 3/2011 | Suess et al. | 362/23 |
| 8,149,099 B2 * | 4/2012 | Fournier et al. | 340/441 |
| 8,172,439 B2 * | 5/2012 | Suss et al. | 362/488 |
| 8,534,218 B2 * | 9/2013 | Ewers et al. | 116/301 |
| 2008/0174416 A1 | 7/2008 | Pala et al. | |

OTHER PUBLICATIONS

International Search Report mailed Feb. 8, 2010 in PCT/EP2009/005666, 3 pages.

* cited by examiner

BACKLIT GRADUATED GAUGE INCLUDING MEANS FOR SUPER-ILLUMINATING A PORTION OF THE GRADUATIONS

CROSS REFERENCE TO RELATED APPLICATIONS

This application is a National Stage application of PCT/EP2009/005666, filed on Aug. 5, 2009, which claims priority of French Patent Application 09/01302, filed Mar. 20, 2009 and German Patent Application No. 10 2008 037 771.6, filed Aug. 14, 2008. The foregoing applications are incorporated by reference herein in their entirety.

FIELD

The invention relates to a motor vehicle gauge that is backlit, such as a speedometer or a revolution counter, and that has a wall provided with translucent graduations disposed over a circular arc, as well as means for lighting all of said graduations, and means for super-illuminating a particular portion of the graduated region, i.e. for highlighting said portion.

BACKGROUND OF THE INVENTION

Such a vehicle gauge that is known from Patent Document WO2007042322 is shown in FIG. 1, in which it is referenced 1. It includes a support plate 2 carrying light-emitting elements that are, in this example, light-emitting diodes (LEDs) 3 uniformly distributed around a central region of said support plate.

Said support plate 2 carries a light guide 4 that is circularly symmetrical in general shape and that has a plane top face 6 defined by a circular periphery so as to diffuse the light emitted by the light-emitting elements towards it top face 6, as represented diagrammatically by arrows.

The wall provided with graduations, which is not shown in FIG. 1, extends parallel to the top face 6 while being fastened directly thereto.

The assembly made up of the light-emitting elements 3 and of the light guide 4 makes it possible to back-light the graduations of the graduated wall. The graduated wall is made of a translucent material, of the Plexiglas type or of some analogous type, and its top face is painted a dark color. The graduations correspond to portions that are not painted, so as to allow the light diffused by the light guide to pass through them.

Although those graduations extend over a circular arc having a radius greater than the radius of the top face 6 of the light guide, they emit the light diffused by the light guide 4 because said light is dispersed throughout the translucent material forming the graduated wall.

Typically, the gauge has a pivotally mounted needle situated in front of the graduated wall, and having its end positioned on the graduation corresponding to the speed of the vehicle, which speed can also be read in the dark by means of the graduations being backlit.

In addition, the gauge has means for super-illuminating a portion of the graduated region, in order to indicate to the driver other speed information distinct from the information given by the pivotally mounted needle. For example, said other speed information is the value at which the cruise control is set, which value can differ from the actual speed when the cruise control has been disengaged by braking or by accelerating.

To this end, the gauge has a spot lighting member 7, including an arm mounted to pivot about the central axis AX while extending radially relative to said axis that also coincides with the pivot axis of the needle and with the axis of circular symmetry of the light guide.

More particularly, the arm 7 is carried by a tubular pivotally mounted hub 8, and it has a free end 9 extending towards the wall (not shown), while also being situated in the vicinity of the circular periphery defining the front face 4, so as to face the graduations of the graduated wall.

As can be seen in the figures, said end 9 diffuses the light referenced 11 towards the graduated wall, in a manner such as to super-illuminate a relatively spot-like region of the graduation portion. Thus, the distance between the end 9 and the axis AX corresponds to the radius of the circular arc along which the graduations are situated.

As regards the pivotally-mounted hub 8 that surrounds the pivot pin carrying the pivotally mounted needle, it may be made of an opaque material or of a transparent material for facilitating passing the light generated by the light-emitting elements towards the light guide 4, given that, by construction, said huh is interposed between the light guide and the support plate 2 carrying the light-emitting elements 3.

The needle (not shown) and the pivotally mounted lighting member are moved and their positions are servo-controlled by a motor unit 12 fastened to the back face of the support plate 2.

OBJECT OF THE INVENTION

An object of the invention is to propose a solution for reducing the cost of manufacturing such a gauge.

SUMMARY OF THE INVENTION

To this end, the invention provides a gauge such as a speedometer or a revolution counter, which gauge has a wall provided with translucent graduations disposed over a circular arc, one or more light-emitting elements carried by a support plate, and a light guide interposed between the support plate and the graduated wall so as to diffuse the light emitted by the light-emitting elements towards a back face of the graduated wall in order to illuminate all of the graduations, wherein the light guide is mounted to pivot about an axis passing through the center of the circular arc; said gauge includes means for servo-controlling the angular position of the light guide; said gauge includes means for holding the graduated wall, which means are distinct from said light guide; and said light guide incorporates a spot lighting member situated radially at the same level as the circular arc so as to highlight a portion of the region carrying the graduations.

With this solution, the number of component parts of the gauge is low since the spot lighting member is carried directly by the pivotally mounted light guide instead of being carried by additional means distinct from the light guide.

The invention also provides a gauge as defined above, wherein the end of the spot lighting member is provided with a light-emitting element such as an LED.

The invention also provides a gauge as defined above, wherein the light-emitting element of the spot lighting member is powered electrically via electrical wires connected to a power supply member carried by the support plate and to said spot lighting member.

The invention also provides a gauge as defined above, wherein the light guide is of general shape that is circularly symmetrical and of a nominal diameter less than the diameter of the circular arc, and wherein said light guide is further provided with an arm extending radially so as to have an end situated beyond its nominal diameter, the spot lighting member being carried by said arm.

The invention also provides a gauge as defined above, wherein the spot lighting member is provided with a light guide having one end situated facing the circular arc along which the graduations are disposed.

DETAILED DESCRIPTION OF THE INVENTION

The basic idea of the invention is to unite the spot lighting element and the light guide into a common element that is pivotally mounted, the graduated wall being carried by means distinct from the light guide.

Figure 1:
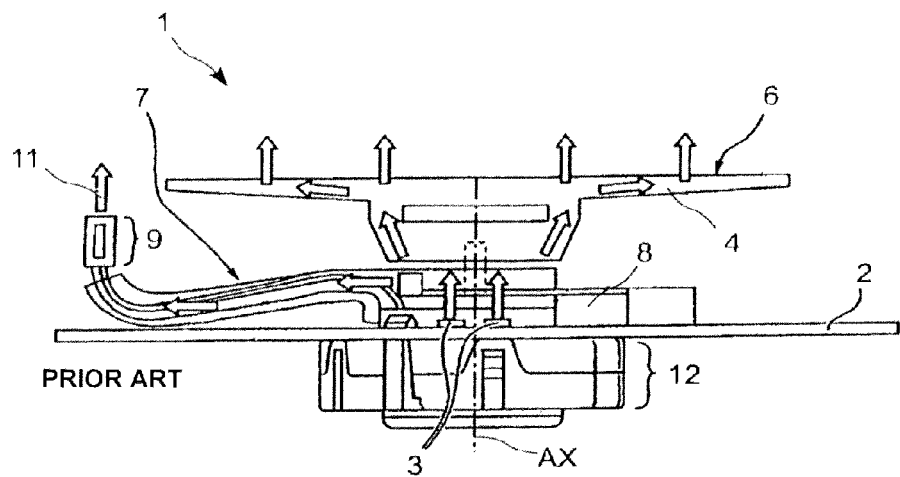
FIG. 1 is a side view of a gauge known from the state of the art.

As can be seen in FIG. 1, the gauge of the invention includes a support plate 13 that has a top face or front face 14 on which a set of twelve light-emitting elements 16 are mounted that are disposed in a circle about a central axis AX that is normal to the front face 14.

In this example, said elements 16 are LEDs surrounding a base 17 that is itself carried by the support plate 13. The light guide that is referenced 18 is of general shape that is circularly symmetrical about the axis AX.

This light guide that is made of a translucent material is defined by a plane top face 19, and by a circularly symmetrical bottom face 21 that is generally convex and that, in its central region, has a protuberance 22 extended by a cylindrical portion defining a central stalk 23. The junction where the bottom face meets the top face corresponds substantially to the circular plane periphery 24 defining the top face 19.

This light guide 18 is further provided with a central opening 26 extending along the axis AX, this opening 26 opening out at one end in the top face 19 and at the other end in the bottom end of the stalk 23, said stalk thus being generally tubular.

Figure 2:
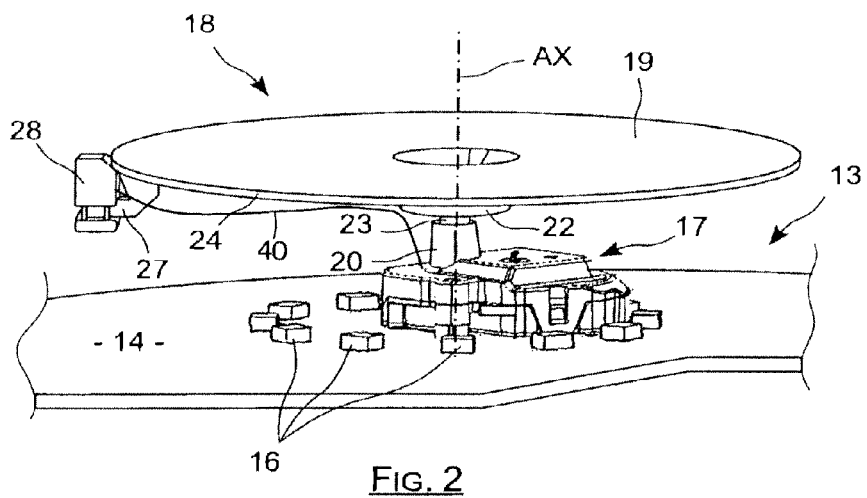
FIG. 2 is a perspective view showing the various components of the gauge of the invention.
Figure 3:
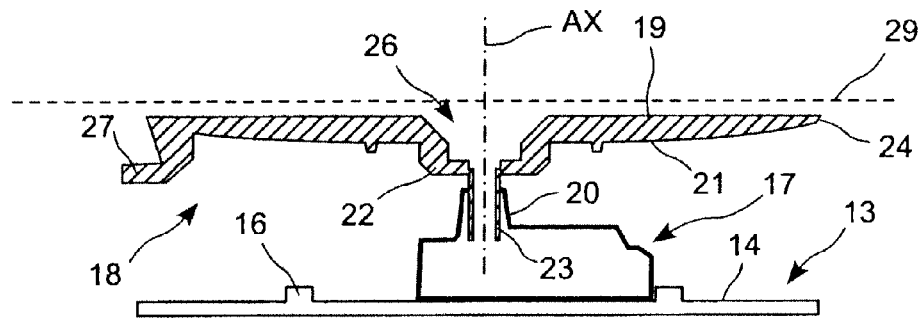
FIG. 3 is a side view in section of the components of the gauge of the invention.

As can be seen in FIGS. 2 and 3, the tubular stalk 23 is engaged in a tubular top portion 20 of the base 17, in such a manner as to be supported by said base, while being able to pivot about the axis AX.

Figure 5:
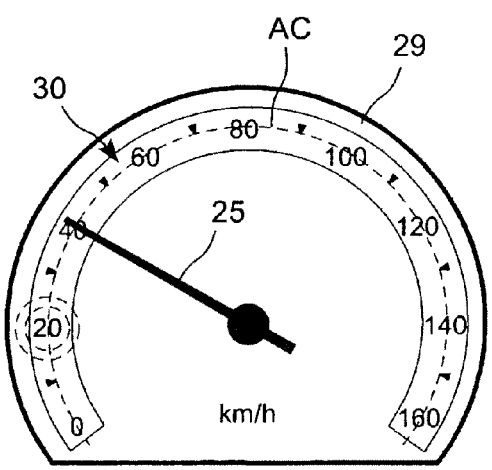
FIG. 5 is a plan view of the gauge showing the front face of its graduated wall.

In addition, the gauge is equipped with a needle 25 that can be seen in FIG. 5 and that is carried by a central pin passing through the opening 26 while extending along the direction AX. The base 17 is provided with motor-driven means (not shown in the figures) that make it possible to place the needle 25 and the light guide 18 in desired angular positions that are independent of each other.

As shown in the figures, the light guide 18 has a radial arm 27 starting from its bottom face 21 in a region close to the periphery 24 and extending radially to the axis AX, beyond the periphery 24 while being situated under the level of the top face 19.

Said arm 27 carries a spot lighting member 29 that generates light towards the graduated wall 29, in such a manner as to light a portion of the graduated region 30. In practice, said spot lighting member 28 that, in this example, comprises an LED, generates a spot of light on the back face of the graduated wall 29 so as to super-illuminate a graduation.

In the example shown in the figures, the spot lighting member 28 that comprises an LED is electrically 20 powered via wires wiring 40, the wiring having one end connected to the member 28 and another end connected to a power supply element carried by the front face 14 of the support plate 13.

These wires are of length and of flexibility suitable for allowing the light guide 18, and thus the lighting member 28, to pivot through an amplitude of about three-quarters of a turn, the low portion of the gauge, i.e. the low portion of the graduated wall 29 not generally being graduated or backlit.

Figure 4:
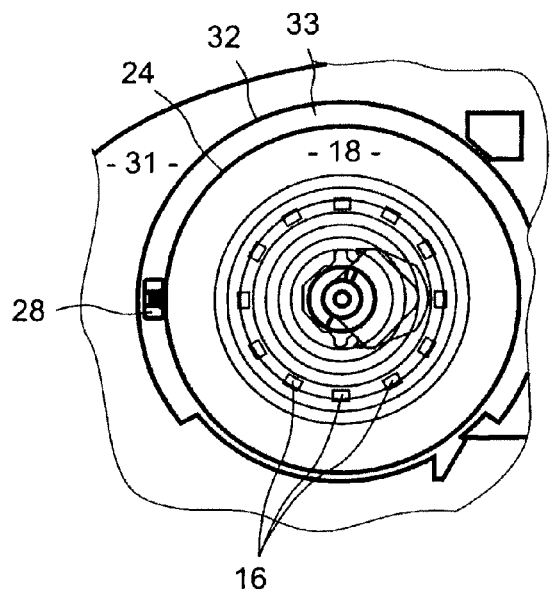
FIG. 4 is a plan view of the elements of the gauge of the invention.

As regards the graduated wall 29, it may be carried by a face plate 31 shown in FIG. 4 and provided with a central opening 32 of diameter greater than the diameter of the periphery 24.

Said face plate 31 is advantageously carried by the support plate 13 by means of intermediate stalks (not shown), while extending parallel to said support plate, and while being situated slightly above the level of the top face 19 of the light guide 18. The central opening 32 thus surrounds the periphery 24 of the light guide 18 when the assembly is seen from above as in FIG. 4, in such a manner as to define a circular slot 33 that is situated facing the graduations on the graduated wall, and in which the spot lighting member 28 is moved when the light guide 18 turns.

The graduated wall 29 may be adhesively bonded directly to the face plate 31, while having its graduations situated in a zone 30 extending over a circular arc AC, said zone 30 corresponding to the slot 33. As can be seen in FIG. 4, said zone 30 is a circular ring portion having an inside diameter corresponding substantially to the diameter of the outlet 24 and an outside diameter corresponding substantially to the diameter of the opening 32.

Thus, the spot lighting member 28 makes it possible to light a portion of the graduated zone 30, which portion is defined by the angular position of the light guide 18. In the configuration of FIGS. 4 and 5, the angular position of the light guide 18 places the additional lighting member facing the inscription "20" of the graduated region 30 so as to highlight said inscription.

What is claimed is:

1. A gauge comprising:
    a wall provided with translucent graduations disposed over a circular arc;
    one or more light-emitting elements carried by a support plate;
    a light guide interposed between the support plate and the wall and configured to diffuse the light emitted by the one or more light-emitting elements towards a back face of the wall so as to illuminate all of the graduations, the light guide being mounted to pivot about an axis passing through a center of the circular arc;
    a motor unit configured to control an angular position of the light guide; and
    a holder configured to hold the graduated wall, which holder is distinct from said light guide;
    wherein said light guide comprises a spot lighting member situated radially at the same level as the circular arc so as to super-illuminate a portion of the region carrying the translucent graduations.

2. The gauge according to claim 1, wherein an end of the spot lighting member is provided with a light-emitting element such as an LED.

3. The gauge according to claim 2, wherein the light-emitting element of the spot lighting member is powered electrically via electrical wiring connected to a power supply member carried by the support plate and connected to said spot lighting member.

4. The gauge according to claim 1, wherein the light guide is generally shaped so as to be circularly symmetrical and of a nominal diameter less than a diameter of the circular arc, and wherein said light guide is further provided with an arm extending radially so as to have an end situated beyond the nominal diameter, the spot lighting member being carried by said arm.

5. The gauge according to claim 1, wherein the spot lighting member is provided with a light guide having one end situated facing the circular arc along which the graduations are disposed.

6. The gauge according to claim 1, wherein the gauge is a speedometer.

7. The gauge according to claim 1, wherein the gauge is a revolution counter.

8. A gauge comprising:

a wall provided with translucent graduations disposed over a circular arc;

one or more light-emitting elements carried by a support plate;

a light guide interposed between the support plate and the wall and configured to diffuse the light emitted by the one or more light-emitting elements towards a back face of the wall so as to illuminate all of the graduations, the light guide being mounted to pivot about an axis passing through a center of the circular arc;

means for servo-controlling an angular position of the light guide; and means for holding the graduated wall;

wherein said light guide comprises a spot lighting member situated radially at a same level as the circular arc so as to super-illuminate a portion of the circular arc of translucent graduations.

* * * * *